United States Patent
Lee

(10) Patent No.: US 10,197,061 B2
(45) Date of Patent: Feb. 5, 2019

(54) ELECTRIC PUMP HAVING CIRCUIT BOARD

(71) Applicant: HYUNDAI MOTOR COMPANY, Seoul (KR)

(72) Inventor: Bong Sang Lee, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 579 days.

(21) Appl. No.: 14/836,725

(22) Filed: Aug. 26, 2015

(65) Prior Publication Data
US 2016/0265538 A1 Sep. 15, 2016

(30) Foreign Application Priority Data
Mar. 9, 2015 (KR) .................. 10-2015-0032758

(51) Int. Cl.
*F04D 13/06* (2006.01)
*F04D 29/02* (2006.01)
(Continued)

(52) U.S. Cl.
CPC ....... *F04D 13/0686* (2013.01); *F04D 29/026* (2013.01); *F04D 29/628* (2013.01);
(Continued)

(58) Field of Classification Search
CPC .. F04D 13/0686; F04D 29/628; F04D 29/669; F05D 2230/23; H02K 2211/03; H05K 3/30; H05K 1/18
(Continued)

(56) References Cited

U.S. PATENT DOCUMENTS 5,162,613 A * 11/1992 Schoenthaler .... H01L 23/49883
174/260
5,997,261 A * 12/1999 Kershaw ............... F04D 29/588
310/54
(Continued)

FOREIGN PATENT DOCUMENTS

JP 2000-014110 A 1/2000
JP 2002111139 A * 4/2002
(Continued)

OTHER PUBLICATIONS

English Machine Translation of JP2002111139A dated Apr. 2002.*

*Primary Examiner* — Nathan C Zollinger
(74) *Attorney, Agent, or Firm* — McDermott Will & Emery LLP

(57) ABSTRACT

An electric pump having a circuit board comprises a motor housing having a rotor and a stator disposed therein, the rotor arranged on a rotation shaft and the stator disposed outside the rotor with a predetermined space therefrom; a first partition wall disposed on a first side of the motor housing and a second partition wall disposed on a second side of the motor housing, the first and second partition walls being fastened to the motor housing; an impeller disposed outside the first partition wall and fastened to an end portion of the rotation shaft; a ceramic board disposed outside the second partition wall and having a first side with a circuit formed thereon, the circuit being electrically connected to the rotor or the stator, the first side further comprising at least one electric device, and a second side facing the second partition wall with recesses arranged in the second side at predetermined distances; and an adhesive member interposed between the ceramic board and the second partition wall.

5 Claims, 4 Drawing Sheets

(51) Int. Cl.
*F04D 29/62* (2006.01)
*F04D 29/66* (2006.01)

(52) U.S. Cl.
CPC ........ F04D 29/669 (2013.01); *F05D 2230/23* (2013.01); *H02K 2211/03* (2013.01)

(58) Field of Classification Search
USPC ........................................................ 361/767
See application file for complete search history.

(56) References Cited

U.S. PATENT DOCUMENTS

| | | | | |
|---|---|---|---|---|
| 7,474,024 B2* | 1/2009 | Nakanishi | .............. | H05K 3/284 |
| | | | | 310/64 |
| 2012/0183421 A1* | 7/2012 | Kim | ........................ | F04D 13/06 |
| | | | | 417/423.7 |
| 2013/0195696 A1* | 8/2013 | Sugimura | .............. | H02K 5/128 |
| | | | | 417/410.1 |

FOREIGN PATENT DOCUMENTS

| | | |
|---|---|---|
| KR | 10-0156449 B1 | 12/1998 |
| KR | 10-2008-0035263 A | 4/2008 |
| KR | 10-2012-0140412 A | 12/2012 |

\* cited by examiner

ELECTRIC PUMP HAVING CIRCUIT BOARD

CROSS-REFERENCE TO RELATED APPLICATION

This application claims the benefit of priority to Korean Patent Application No. 10-2015-0032758, filed in the Korean Intellectual Property Office on Mar. 9, 2015, the entire content of which is incorporated herein by reference.

TECHNICAL FIELD

The present disclosure relates to an electric pump having a circuit board, in which a motor housing has a motor chamber having a rotor and a stator arranged therein, a coolant pump impeller arranged in front of the motor chamber, and a controller chamber having a circuit board arranged therein formed in a rear portion of the motor chamber.

BACKGROUND

In contrast to a mechanical water pump driven by engine power, an electric water pump may be independently controlled by a motor.

Because an electric water pump may drive cooling water according to operating conditions of an engine and a vehicle independently of the operation of the engine, an electric water pump may provide several advantages.

First, an engine warm-up time period may be shortened by stopping circulation of the cooling water through the electric pump at initial startup. Second, power consumption may be reduced compared to the mechanical water pump by 60~70% flow rate control. Third, motor driving, not belt driving, is favorable in view of layout.

At the same time, a BLDC motor is applied as a DC motor that is used for rotation of an impeller which pumps the cooling water, and a controller which controls the BLDC motor is built into the motor.

Since the controller has high device density due to integration of the circuit, and is positioned within a small space due to a limited size of the motor for mounting the motor to the engine, the controller may include the board on which a circuit may be printed and devices attached to the board.

Regarding the boards, there are FR4 (a resin group) boards and ceramic boards, where a ceramic board is preferable at high temperature and enables high density integration using various techniques, such as a printing circuit technique, and has excellent high-temperature characteristics.

Furthermore, because the ceramic board has one side with the circuit printed thereon and the other side which may be insulated and require cooling, the ceramic board may be attached to a partition wall which divides the controller chamber from the motor chamber or a separate mounting case.

In this instance, despite the merits of the ceramic, one reason why the ceramic board is attached thus is because of the difficulty in securing the ceramic board using a bolt or a nut due to its high brittleness, and its vulnerability to impact. Thus, a ceramic board is susceptible to breakage both in driving and handling, and assembly of the ceramic board may be difficult even when the ceramic board is attached to the electric water pump.

The above information disclosed in this Background section is only for the enhancement of the understanding of the background of the inventive concept and therefore it may contain information that does not form the prior art that is already known in this country to a person of ordinary skill in the art.

SUMMARY

The present disclosure has been made in an effort to provide an electric pump having a ceramic circuit board having advantages related to preventing the ceramic board from breaking during driving and handling, and improving assemblability of the ceramic board.

One aspect of the present inventive concept provides an electric pump having a ceramic circuit board for preventing the ceramic board which is favorable for a high temperature for being built in a high temperature motor housing from breaking during driving and handling, and improving assemblability of the ceramic board.

The electric pump having a circuit board in accordance with an embodiment of the present inventive concept may include a motor housing having a rotor and a stator disposed therein, the rotor arranged on a rotation shaft and the stator disposed outside the rotor with a predetermined space therefrom; a first partition wall disposed on a first side of the motor housing and a second partition wall disposed on a second side of the motor housing, the first and second partition walls being fastened to the motor housing; an impeller disposed outside the first partition wall and fastened to an end portion of the rotation shaft; a ceramic board disposed outside the second partition wall and having a first side with a circuit formed thereon, the circuit being electrically connected to the rotor or the stator, the first side further comprising at least one electric device, and a second side facing the second partition wall with recesses arranged in the second side at predetermined distances; and an adhesive member interposed between the ceramic board and the second partition wall.

The adhesive member may include a first adhesive member disposed in the recesses; and a second adhesive member disposed on an outside surface of the second partition wall facing the ceramic board, wherein the ceramic board is attached to the second partition wall by the first adhesive member and the second adhesive member being attached to each other.

The first adhesive member may be attached to the second adhesive member and the first adhesive member may protrude outside the recesses.

The electric pump may further include a separator arranged to separate a space in which the stator is disposed from a space in which the rotor is disposed, the separator having a first end portion facing the second partition wall with a first end of the rotation shaft rotatably secured to the first end portion by a bearing and a second end portion fastened to the first partition wall, and a passage formed in the first partition wall, wherein cooling water that passes the impeller subsequently passes through the passage to an inside of the separator, and flows around a circumference of the rotor.

The separator may have a protruding portion that protrudes along a center axis matched to the rotation shaft in a direction towards a controller chamber, and wherein the protruded portion is inserted into a recess in the second partition wall.

The ceramic board may include a ceramic material.

DETAILED DESCRIPTION

An exemplary embodiment of the present inventive concept will hereinafter be described in detail with reference to the accompanying drawings.

Figure 1:
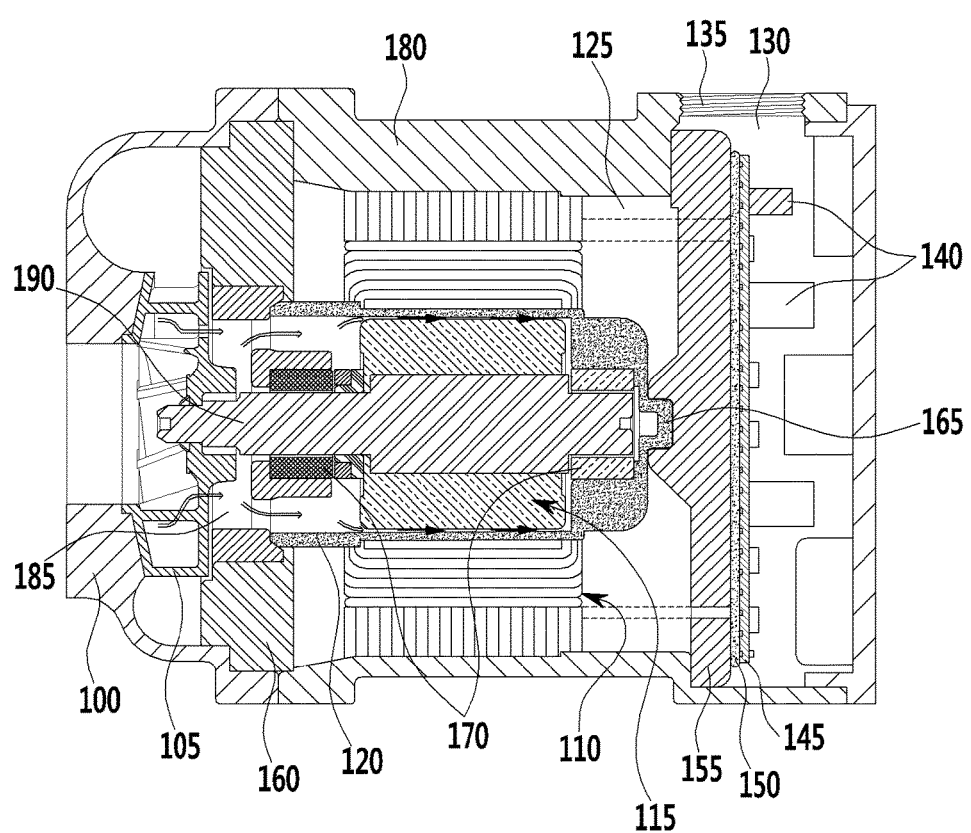
FIG. 1 schematically illustrates a cross-sectional view of an electric pump having a circuit board in accordance with an exemplary embodiment of the present inventive concept.

FIG. 1 schematically illustrates a cross-sectional view of an electric pump having a circuit board in accordance with an exemplary embodiment of the present inventive concept.

Referring to FIG. 1, the electric pump includes a motor housing 180, a motor chamber 125, a terminal connecting portion 135, a controller chamber 130, electric devices 140, a protruded portion 165, a board 145, an adhesive member 150, a second partition wall 155, a rotor 115, a stator 110, bearings 170, a separator 120, a first partition wall 160, a pump impeller 105, a pump housing 100, a passage 185, and a rotation shaft 190.

The shaft 190 is arranged along a length direction center axis, and the shaft 190 has one end with a cooling water pump impeller 105 secured thereto while the other end is rotatably arranged through the bearings 170 on an inner center portion of the separator 120.

The rotor 115 is secured between opposite ends of the shaft 190, and the stator 110 is arranged with a gap to an outside circumferential surface of the rotor 115 and is secured to an inside of the motor housing 180.

The motor housing 180 has the first partition wall 160 and the second partition wall 155 fastened thereto, the first partition wall 160 separates the pump chamber having the impeller 105 arranged therein from the motor chamber 125 having the rotor 115 and the stator 110 arranged therein, and the first partition wall 160 has a passage 185 formed therein for enabling the cooling water which passes through the impeller 105 to flow toward the motor chamber 125.

The separator 120 has a cup shape with an opening facing the impeller 105 interposed between the stator 110 and the rotor 115, wherein the shaft 190 and the rotor 115 are arranged on the inside of the separator 120 and the stator 110 is arranged on the outside of the separator 120.

The shaft 190 has one end with the impeller 105 secured thereto, and the other end rotatably arranged through the bearings 170 inserted to the inside of the separator 120.

The separator 120 separates a space wherein the rotor 115 is arranged from a space wherein the stator 110 is arranged for preventing the cooling water introduced to the inside of the separator 120 from leaking toward the stator 110.

As shown, the protruded portion 165 of the separator 120 is formed to protrude from a position matched to the center axis on which the shaft 190 is arranged in a direction the second partition wall 155 is arranged, wherein the protruded portion 165 is inserted in, and secured to, a recess formed in one side of the second partition wall 155.

The second partition wall 155 has one side with the protruded portion 165 of the separator 120 inserted therein and secured thereto and the other side with the board 145 attached thereto, and the adhesive member 150 is interposed between the board 145 and the second partition wall 155.

The board 145 has the circuit 310 (Refer to FIG. 3) printed thereon, and the electric devices 140 are matched to the circuit 310. Along with this, the terminal connecting portion 135 is formed in the motor housing 180 for supplying electricity to the electric devices 140.

Figure 2:
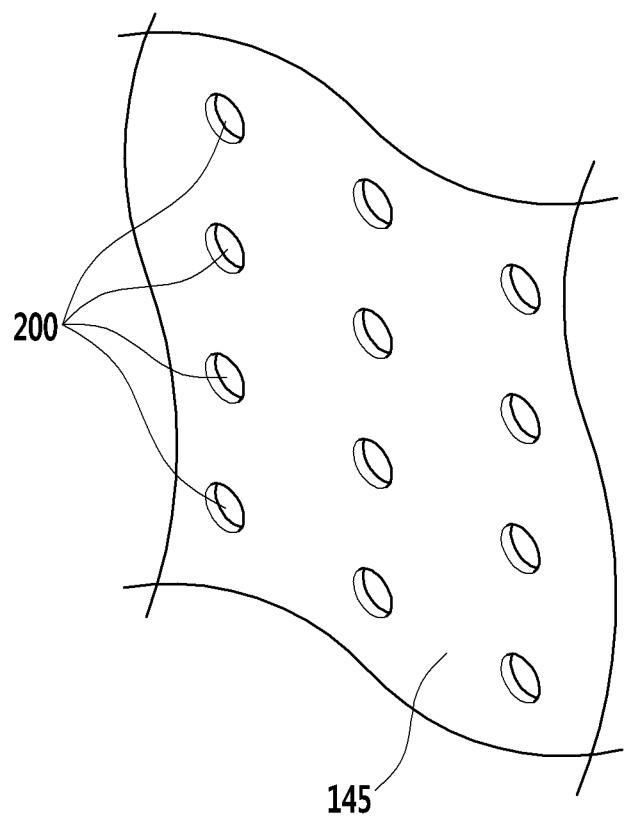
FIG. 2 illustrates a partial perspective view of a circuit board in accordance with an exemplary embodiment of the present inventive concept.

FIG. 2 illustrates a partial perspective view of a circuit board in accordance with an exemplary embodiment of the present inventive concept.

Referring to FIG. 2, recesses 200 are formed in the board 145 in a surface facing the second partition wall 155. The recesses 200 are arranged in a horizontal direction and a vertical direction at predetermined spaces and depths.

Figure 3:
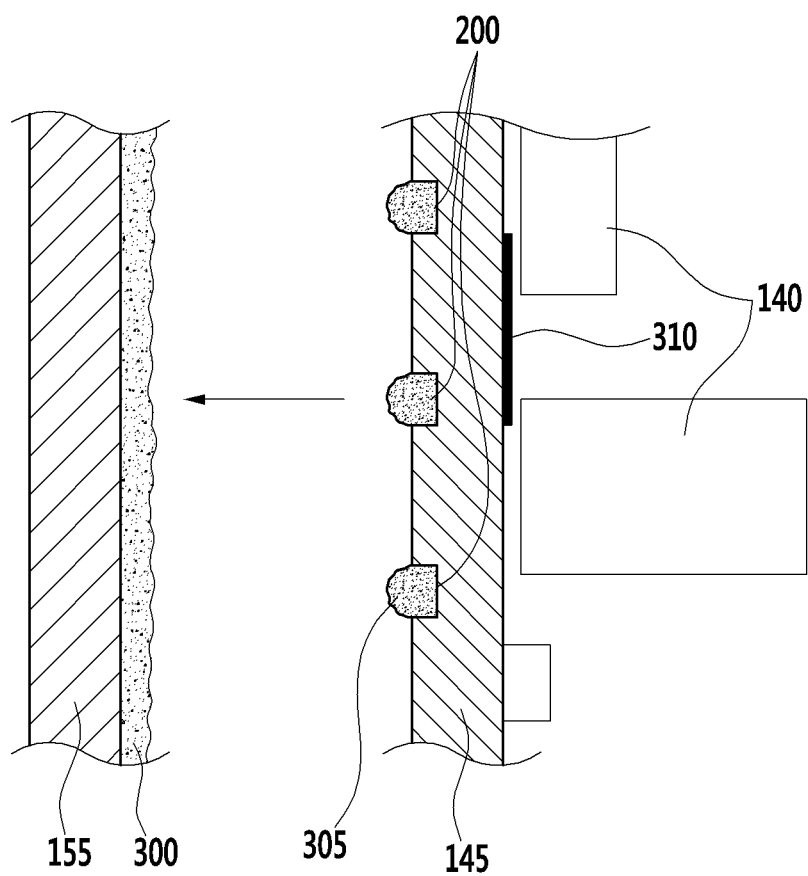
FIG. 3 illustrates a partial cross-sectional view of a circuit board in accordance with an exemplary embodiment of the present inventive concept in a state before the circuit board is attached to a partition wall.

FIG. 3 illustrates a partial cross-sectional view showing a state of a circuit board in accordance with an exemplary embodiment of the present inventive concept, before the circuit board is attached to a partition wall.

Referring to FIG. 3, the circuit board 145 has a side facing the second partition wall 155 with the recesses 200 formed therein, and a first adhesive member 305 is filled in the recesses 200. Further, the second partition wall 155 has a side facing the circuit board 145 with a second adhesive member 300 coated thereon.

The circuit board 145 has a side opposite to the side having the recess formed therein with the circuit 310 printed thereon, and the circuit 310 has the electric devices 140 arranged at predetermined positions.

At the time that the circuit board 145 is attached to the second partition wall 155, since the first adhesive member 305 filled in the recess 200 is adhered to the second adhesive member 300 adhered to the second partition wall 155, the circuit board 145 is easily secured to the second partition wall 155.

The first adhesive member 305 and the second adhesive member 300 absorb vibration and noise forwarded from the motor chamber 125 to the circuit board 145, preventing the circuit board 145 from being broken in advance, thereby improving durability of the electric pump overall.

Figure 4:
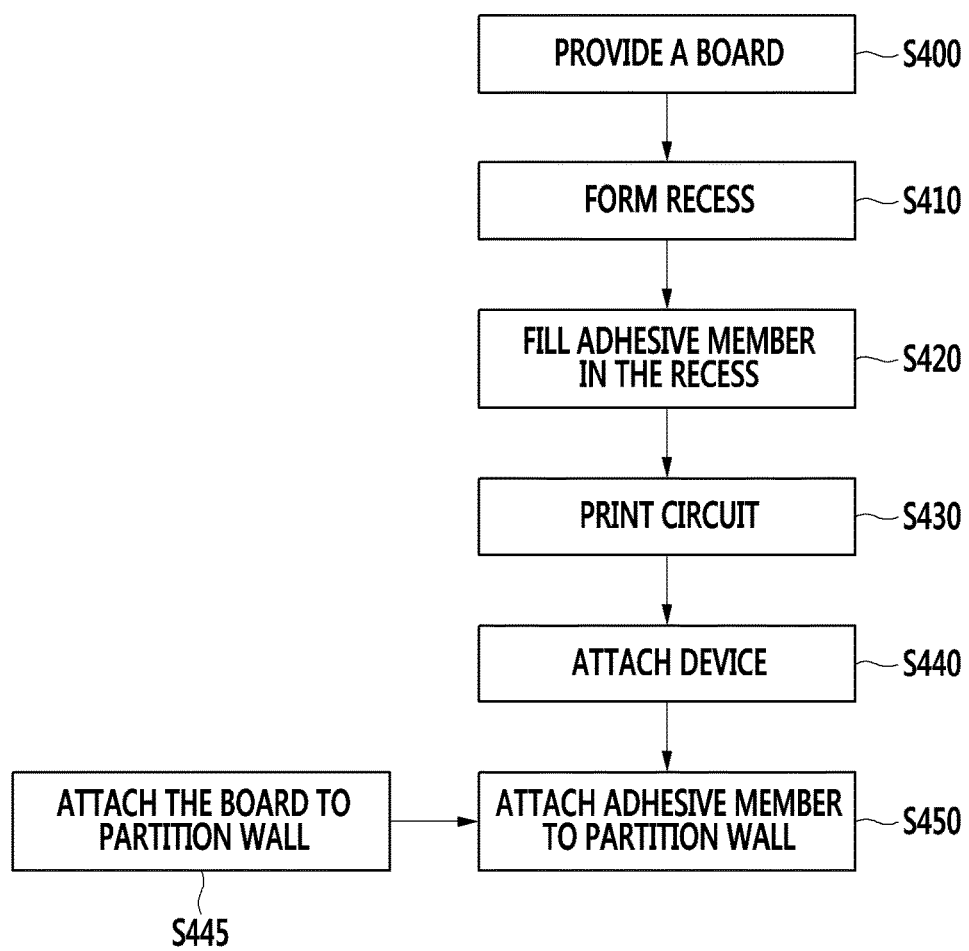
FIG. 4 illustrates a flowchart showing the steps of a method for attaching a circuit board to a partition wall in accordance with an exemplary embodiment of the present inventive concept.

FIG. 4 illustrates a flowchart showing the steps of a method for attaching a circuit board to a partition wall in accordance with an exemplary embodiment of the present inventive concept.

Referring to FIG. 4, the circuit board 145 is provided in S400, and the recess 200 is formed in one side of the circuit board 145 in S410. Refer to the known art on a technology for forming the recess 200 in the circuit board 145.

The first adhesive member 305 is filled in the recess 200 formed in the circuit board 145 in S420, and a circuit 310 is formed on the other side of the circuit board 145 by printing the circuit 310 thereon in S430.

Then, the electric devices 140 are matched to the circuit 310 formed on the circuit board 145 in S440. A second adhesive member 300 is formed on the second partition wall 155 in S445, and finally the circuit board 145 is attached to the second partition wall 155 in S450. In this case, the first adhesive member 305 and the second adhesive member 300 are adhered to each other.

The first and second adhesive members 150 are interposed between the second partition wall 155 and the circuit board 145 to absorb vibration and noise and carry out an insulation function for cutting off heat from being forwarded from a side of the rotor 115 or the stator 110 to a side of the circuit board 145, and preventing the circuit board 145 made of ceramic from being broken in advance, thereby improving durability overall.

While this inventive concept has been described in connection with what is presently considered to be practical exemplary embodiments, it is to be understood that the inventive concept is not limited to the disclosed embodiments. On the contrary, it is intended to cover various modifications and equivalent arrangements included within the spirit and scope of the appended claims.

What is claimed is:

1. An electric pump having a circuit board comprising:
    a motor housing having a rotor and a stator disposed therein, the rotor arranged on a rotation shaft and the stator disposed outside the rotor with a predetermined space therefrom;
    a first partition wall disposed on a first side of the motor housing and a second partition wall disposed on a second side of the motor housing, the first and second partition walls being fastened to the motor housing;
    an impeller disposed outside the first partition wall and fastened to an end portion of the rotation shaft;
    a circuit board disposed outside the second partition wall and having a first side with a circuit formed thereon, the circuit being electrically connected to the rotor or the stator, the first side of the circuit board further comprising at least one electric device, and a second side of the circuit board facing the second partition wall with recesses arranged in the second side at predetermined distances; and
    an adhesive member interposed between the circuit board and the second partition wall,
    wherein the adhesive member includes:
        a first adhesive member disposed in the recesses disposed in the second side of the circuit board; and
        a second adhesive member coated on an outside surface of the second partition wall facing the circuit board,
    wherein the circuit board is attached to the second partition wall by the first adhesive member and the second adhesive member being attached to each other,
    wherein the first and second adhesive members absorb vibration and noise forwarded to the circuit board,
    wherein the second adhesive member is a solid continuous layer that surrounds and encapsulates exposed surfaces of the first adhesive member.

2. The electric pump of claim 1, wherein the first adhesive member protrudes outside the recesses.

3. The electric pump of claim 1, further comprising
    a separator arranged to separate a space in which the stator is disposed from a space in which the rotor is disposed, the separator having a first end portion facing the second partition wall with a first end of the rotation shaft rotatably secured to the first end portion by a bearing and a second end portion fastened to the first partition wall,
    and a passage formed in the first partition wall,
    wherein cooling water that passes the impeller subsequently passes through the passage to an inside of the separator, and flows around a circumference of the rotor.

4. The electric pump of claim 3, wherein
    the separator has a protruding portion that protrudes along a center axis matched to the rotation shaft in a direction towards a controller chamber, and
    wherein the protruding portion is inserted into a recess in the second partition wall.

5. The electric pump of claim 1, wherein the circuit board includes a ceramic material.

* * * * *